United States Patent [19]

de Mars

[11] Patent Number: 5,099,688
[45] Date of Patent: Mar. 31, 1992

[54] THERMOGRAPHIC METHOD FOR DETERMINING THE VOLUME OF CONCRETE IN A MIXING CONTAINER

[75] Inventor: John O. de Mars, Wilmington, Mass.

[73] Assignee: W.R. Grace & Co.-Conn, New York, N.Y.

[21] Appl. No.: 675,356

[22] Filed: Mar. 25, 1991

[51] Int. Cl.$^5$ .............................. G01F 23/22; G01K 3/00
[52] U.S. Cl. ............................................. 73/295; 73/291; 366/142; 374/162
[58] Field of Search ................ 73/295, 291; 374/162; 366/142, 16

[56] References Cited

U.S. PATENT DOCUMENTS

| | | |
|---|---|---|
| 3,138,023 | 6/1960 | Washburn . |
| 3,479,875 | 11/1969 | Riddel . |
| 3,533,399 | 10/1970 | Goldberg et al. . |
| 3,617,374 | 11/1971 | Hodson .............................. 374/162 X |
| 3,696,675 | 10/1972 | Gilmour ................................. 73/295 |
| 3,736,861 | 6/1973 | Kroyer et al. ................... 374/162 X |
| 3,827,301 | 8/1974 | Parker . |
| 4,117,547 | 9/1978 | Mathis et al. ........................ 366/17 |
| 4,358,955 | 11/1982 | Rait ...................................... 73/295 |
| 4,364,666 | 12/1982 | Keyes ................................... 366/142 |
| 4,590,797 | 5/1986 | Beaubatie et al. . |

FOREIGN PATENT DOCUMENTS 0119072 9/1984 European Pat. Off. .
0132233 1/1985 European Pat. Off. .

OTHER PUBLICATIONS

Product Description "Wall Model (WM) TM ", Temperature Dynamics, Inc., Jan. 1978.
Brochure entitled: "The Recovery System Advantage", W. R. Grace & Co.-Conn (Jul. 1990).
Technical Bulletin "The Grace Recovery System for Concrete Reclamation"(1988).

*Primary Examiner*—Daniel M. Yasich
*Attorney, Agent, or Firm*—William L. Baker; Chester Cekala; Craig K. Leon

[57] ABSTRACT

The present invention relates to a method for determining the level of concrete in a concrete mixer comprising the steps of contacting the exterior of concrete mixing drum with a strip of thermal color sensitive material and observing the interface on the color sensitive material produced by the temperature differential between the concrete and the air above. This level can then be lined up horizontally with a graduated volume indicator, to yield the concrete volume in the truck to aid in determining an effective amount of additive to be added to the concrete.

10 Claims, 1 Drawing Sheet

THERMOGRAPHIC METHOD FOR DETERMINING THE VOLUME OF CONCRETE IN A MIXING CONTAINER

FIELD OF THE INVENTION

The present invention relates to a method for externally measuring the level of concrete in a concrete mixing drum. Specifically, the present invention relates to thermographic method for determining the volume of concrete in a mixing container.

BACKGROUND

In recent years, the concrete industry has been deluged with a plethora of exotic additives for concrete. These additives include air entraining agents, air detraining agents, accelerants, alkali reactivity reducers, superplasticizers, pumping aids, water reducing admixtures, corrosion inhibitors, permeability reducers and fibers, to name a few. When utilizing these additives, it is important, and often critical, to know the volume of concrete into which the additive is to be added. This is particularly critical when adding set retarders or delayed setting admixtures.

In a typical concrete application, the concrete mixing truck will return to the concrete mixing yard with some wet concrete still in the drum. In the past, this volume had been washed out directly into a landfill and wasted. Unfortunately, this is not an environmentally friendly practice. This type of wasting has a deleterious effect on ground water. Accordingly, concrete vendors would like to recover their unused cement and use it the next day. Unfortunately, mechanical reclaiming systems require a large capital investment initially and a lot of ongoing maintenance to keep them operational. As a result, many products have entered the market for use as set retarders. These products include lignosulfonates, hydroxylated carboxylic acids, lignin, borax, gluconic, tartaric and other organic acids and their corresponding salts, and certain carbohydrates. Unfortunately, these materials require the user to know how much concrete remains in the truck to a fairly accurate degree. If too little set retarder is added to the concrete, the concrete will set up overnight and have to be chiseled out. If too much set retarder is added, the resulting concrete may never set properly. Unfortunately, it has proved to be increasingly difficult to provide a simple determination for volume in a concrete truck.

At present, the only accurate means of determining the volume of concrete in the truck to weight the truck empty, and weigh it upon its return from the job site. The gravimetric determination is then converted to volume with a simple density conversion factor. Unfortunately, many small concrete vendors do not have this capability and furthermore, other factors, like gasoline usage and water content in the wash tank can inadvertently affect the weight change.

Some have proposed taking comparative photographs of the inside of the mixing truck at different concrete volume levels and using those to determine the volume. This method has proved to be unreliable.

Accordingly, it is an object of the present invention to provide a simple, accurate method for determining the volume of concrete in a concrete mixer.

SUMMARY OF THE INVENTION

The present invention relates to a method for determining the level of concrete in a concrete mixer comprising the steps of contacting the exterior of concrete mixing drum with a strip of thermal color sensitive material and observing the interface on the color sensitive material produced by the temperature differential between the concrete and the air above. This level can then be lined up, horizontally, with a graduated volume indicator, to yield the concrete volume in the truck.

DETAILED DESCRIPTION OF THE PRESENT INVENTION

Figure 1:
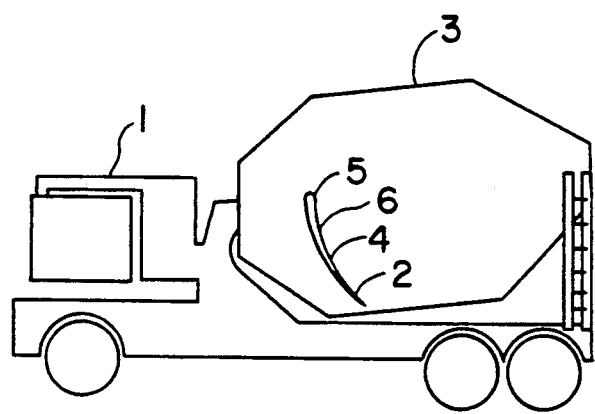
FIG. 1 is a side view of a cement mixing truck with a strip of thermal color sensitive material magnetically adhered to the side of the mixing drum.

Applicant has discovered that it is possible to determine the volume of concrete in the mixing drum of a concrete mixer by measuring temperature differences at the outside of the metal mixing drum between the concrete-contacting metal and the air-contacting metal portion. The volume is determined by placing a thermographic strip, preferably magnetic-backed, on the exterior of the mixing drum. The thermographic strip senses the temperature differential which occurs in the steel drum at the concrete level and changes color. The location of the color change is then matched with calibration marks near the drum to determine the volume. It should be pointed out that the drum must not be mixing, i.e. rotating, during the determination.

As used herein, the term "thermal color sensitive material" refers to liquid crystal compositions. The use of these materials for thermometric purposes is described in British Patent 1,138,590; U.S. Pat. No. 3,440,882; U.S. Pat. No. 3,617,374; and U.S. Pat. No. 3,533,399, all incorporated herein by reference. For the purposes of the present invention it is important that the thermal color sensitive material provide a distinct color interface over the entire temperature range of air and concrete used in the field. This range is thought to be from about 30° F. to about 120° F. Preferred strips are thermographic films manufactured by Hallcrest Mfg., Glenview, Ill. When the difference between the concrete temperature and the air temperature is greater than 10° F., the strip produces a distinct cooler change at the concrete level within 30 seconds. A dark-blue color is produced in the cooler zone (usually above the concrete level), and a light-grey color is produced in the warmer zone (usually below the concrete level). The specific type of thermal color sensitive material is not critical to the present invention, provided it produces an observable interface with a temperature difference between the concrete and air of less than about 10° F., preferably less than about 5° F., most preferably less than 1° F.

The strips of color sensitive material may be permanently affixed to the outside of the drum. However, at present, these materials are somewhat exotic, and therefor expensive. Thus, in applicant's preferred embodiment, the strips should be relatively short and reusable. The reusable feature of the present invention can be achieved by using a magnetic backing on the strip as described in U.S. Pat. No. 4,358,955, incorporated herein by reference, or by the use of a non-permanent adhesive, such as a pressure sensitive adhesive, which allows the strip to be removed from, and relocated on, the concrete mixing container. The magnetic method is most preferred since applicant believes that a non-permanent adhesive would quickly be fouled by dust and dirt, which are commonly found on construction sites. A convenient size for the strips is from about 1 inch to about 3 inches in width, and from about 12 inches to about 36 inches in length.

Applicant has also discovered that it is particularly useful to have a graduated fluid level guide positioned near the mixing drum wherein said graduations correspond to the level of fluid in the drum. The guide may be mounted permanently on the outside of a concrete mixing truck, or be as simple as a measuring stick which is used in conjunction with a reference point on the truck, near the drum.

As was mentioned earlier, the present invention is particularly suited for use with concrete set retarders. Two currently commercialized products are RECOV-ER ® brand set retarder, distributed by W. R. Grace & Co.-Conn., Cambridge, Mass; and DELVO ® brand set retarder, marketed by Master Builders Division of Sandoz Ltd., Basel, Switzerland. DELVO ® is a phosphonic acid type set retarder described in U.S. Pat. No. 4,964,917, issued Oct. 23, 1990 to Bobrowski et al. incorporated herein by reference.

The preferred retarders are phosphonic acid derivatives, more preferably those containing hydroxy and amino groups, which are capable of acting as calcium chelating agents.

Other suitable retarders include hydroxycarboxylic acids and their salts, including citric, gluconic, tartaric, fumaric, itaconic, malonic and glucoheptanoic acids; polycarboxylic acids and their salts, e.g., polymaleic, polyfumaric, polyacrylic and polymethacrylic acids, preferably of low molecular weight; antioxidants, e.g., ascorbic acid, isoascorbic acid; polymers, e.g., suphonic acid-acrylic acid copolymers, polyhydroxysilanes and polyacrylyamide, preferably of low molecular weight; carbohydrates, e.g., sucrose and corn syrup; and lignosulphones, e.g., calcium lignosulphonates. Of these, the hydroxycarboxylic acids, polycarboxylic acids, ascorbic acid, soascorbic acid, carbohydrates and polyhydroxysilanes are preferred.

More preferred retarders are mixtures of at least one retarder of the phosphonic acid type with at least one retarder of a different type. As many of the non-phosphonic acid retarders e.g., citric acid also have water-reducing properties, these may also have the effect of increasing the compressive strength of the final set concrete.

The effective amount of retarder varies as a function of temperature, the amount of water, desired retardation time, specific materials involved (admixtures, cement type and brand), and the type of retarder. Because materials and operating conditions vary from area to area, pretesting is required for selection of actual dosage rates. This determination is within the skill of one in this area. Once this dosage profile is established it can be reproduced without pretesting, provided the volume of concrete is known.

After set retarders are used, an accelerating agent, or hydration accelerating agent is used, typically to restore the concrete to a setable mixture. For short retardation periods accelerants are not usually required.

Preferred accelerating agents which may be used in thins invention to reactivate the retarded concrete are those classified in ASTM C 494 Type C admixtures. Preferred accelerator compositions are chloride-free and may contain for example calcium salts, e.g., calcium nitrate and calcium formate, thiocyanates, e.g., sodium thiocyanate, triethanolamine and glycolurils, e.g., trimethylolglycoluril. A preferred accelerator of this type is that sold by Master Builders Inc., Cleveland, Ohio, under the tradename POZZOLITH 555 A. The most preferred accelerators are sold by W. R. Grace & Co.-Conn., Cambridge, Mass. under the tradenames DARACCEL and DARASET.

It is theoretically possible that the concrete in the drum and the air above will be at nearly the same temperature. In such instances, it is still possible to utilize the present invention by spraying the outside of the drum with a volatile liquid, like water, isopropyl alcohol or mixtures thereof. As the volatile liquid evaporates, the rates of evaporation are affected by the thermal mass of the concrete with the drum. This corresponds to a difference in evaporative cooling above and below the level line; thus exaggerating the thermographic effect.

Referring to FIG. 1, there is shown a cement mixer 1 with thermal color sensitive strip 2 adhered to the outside of the drum 3. The thermal characteristics of the concrete and the air above, result in different color effects on the strip 4 and 5. The level of concrete in the truck is the interface 6 between the colors.

As used herein, the term "concrete mixer" means any conventional batch, semi-batch or continuous concrete mixer which thoroughly mixes the cement and aggregates so as to obtain a homogeneous mass and coat all particles with cementitious paste. Preferred concrete mixers are rotating mixers, consisting of a revolving drum or a square box revolving about its diagonal axis and usually provided with deflectors and blades to improve the mixing. Mixers with opaque, metallic mixing drums are most preferred.

Although a certain specific embodiments of the invention have been shown and described for use in a particular type of container, it will be apparent in accordance with the broader aspect of the invention various modifications and other embodiments are possible. For example, different dimension strips can be used and different thermographic materials may be incorporated. It is to be understood, therefore, that the invention is not limited to the specific arrangements shown, but in its broadest aspect, it includes all equivalent embodiments and modifications which come within the scope of the invention.

EXAMPLE I

Method of Determining the Volume of Concrete in a Mixing Container

An industrial concrete mixing truck returns to the concrete yard with residual concrete still inside the mixing drum from the day's job. The truck is stopped and mixing drum rotation is halted. The truck driver obtains the strip of thermal color sensitive material. This material is 2 inches wide by 18 long, has a 10 mil. magnetic strip back, a 1 mil. thermographic film, and is manufactured by the Hallcrest Mfg. Co., Glenview, Ill. The strip is contacted to the outer surface of the metallic mixing drum (thermal color sensitive material-side facing out). The strip is allowed to equilibrate for approximately 30 seconds, provided the difference in temperature between the concrete and the air above is greater than 10° F., the strip will turn light-grey above the concrete level and dark-blue below the concrete level. The interface where the light-grey and the dark-blue regions contact, is the concrete level in the truck.

When the difference between the concrete temperature and the air above is less than 10° F., a mist of cool water is applied to the strip and the surrounding drum area. After about 30 seconds, the above color change will evolve and produce the concrete level line.

EXAMPLE II

Method of Recovering Unused Concrete

The concrete level line of Example I can be used to calculate the volume of concrete in the truck. First, a vertical fluid level guide which is calibrated to drum volume is positioned adjacent to the drum region where the thermal color sensitive material is applied. Next, the operator horizontally lines up the concrete level line and the graduations and reads the concrete volume directly from the vertical fluid level guide. Next, the operator uses the dosage chart, or dosage rate profile, with a selected retarding agent. When the retarding agent is RECOVER® brand set retarder manufactured by W. R. Grace & Co.-Conn., Cambridge, Mass., the dosage rate will range from 3 to 150 fl. oz./cwt depending on the specific materials involved, operating conditions, and desired stabilization. Once the amount of set retarder is calculated, it is dosed into the concrete, agitated sufficiently, and is allowed to remain unused for the desired retardation period.

At the end of the desired retardation period, an effective amount of hydration accelerating agent is added to the retarded concrete in the mixing drum to restore it to its settable state. When DARACCEL or DARASET brand accelerants manufactured by W. R. Grace & Co.-Conn., Cambridge, Mass., are added, the required dosage rate will range from 0 to 100 fl. oz./cwt. depending on the stabilization period and the ratio of fresh to stabilized concrete in the drum. Typically, unused concrete can be retarded in a fresh state for up to 72 hours.

What is claimed is:

1. A method for dosing a concrete additive in a concrete mixer comprising the steps of:
   a) providing a concrete mixer comprising a drum and a vertical fluid level guide wherein the vertical guide is graduated to indicate the volume of material in the drum at a given horizontal level;
   b) contacting the drum exterior of said concrete mixer with a strip of thermal color sensitive material at a position adjacent to the vertical fluid level guide;
   c) observing the interface on the color sensitive material produced by the temperature differential between said concrete and the air above;
   d) determining the volume of concrete in the concrete mixer by horizontally aligning the interface of step (c) and said volume graduation on the vertical fluid level guide; and
   e) adding an effective amount of concrete additive based on the volume of concrete in the concrete mixer, wherein the concrete additive is selected from the group consisting of air entraining agents, air detraining agents, accelerants, set retarders, alkali reactivity reducers, superplasticizers, pumping aids, water reducing admixtures, corrosion inhibitors, permeability reducers and fibers.

2. A method according to claim 1 wherein the concrete additive is a concrete set retarder.

3. A method according to claim 2 wherein the concrete set retarder is selected from the group consisting of phosphonic acid derivatives containing hydroxy and amino groups which are capable of acting as calcium chelating agents, hydroxy carboxylic acids and their salts, polycarboxylic acids and their salts, antioxidants, polymers, carbohydrates, and lignosulphones.

4. A method according the claim 3 wherein the thermal color sensitive material produces an observable interface with a temperature difference between the concrete and the air above of less than about 10° F.

5. A method according to claim 4 wherein the thermal color sensitive material produces an observable interface with a temperature difference between the concrete and the air above of less than about 5° F.

6. A method according to claim 4 wherein the strip of thermal color sensitive material comprises an adhesive backing which allows the strip to be secured to any concrete mixer container.

7. A method according to claim 4 wherein the strip of thermal color sensitive material further comprises a magnetic backing which allows the strip to be repeatedly secured to, removed from and relocated on metallic concrete mixer containers.

8. A method according to claim 7 wherein the adhesive is a non-permanent adhesive which allows the strip to be removed from and relocated on the concrete mixer container.

9. A method according to claim 7 or 8 wherein the outside of the mixing drum is sprayed with a volatile liquid prior to step (a) wherein the liquid evaporative rates above and below the concrete level exaggerate the temperature differential.

10. A method according to claim 9 wherein the volatile liquid is selected from the group consisting of water, isopropyl alcohol and mixtures thereof.

* * * * *